United States Patent
Liu et al.

(10) Patent No.: US 9,455,461 B2
(45) Date of Patent: Sep. 27, 2016

(54) SYSTEM AND METHOD FOR FUEL CELL DEGRADATION MANAGEMENT

(71) Applicant: The Boeing Company, Chicago, IL (US)

(72) Inventors: Shengyi Liu, Sammamish, WA (US); Lijun Gao, Renton, WA (US); Joseph S. Breit, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 165 days.

(21) Appl. No.: 14/180,883

(22) Filed: Feb. 14, 2014

(65) Prior Publication Data

US 2015/0236365 A1    Aug. 20, 2015

(51) Int. Cl.
*H01M 8/04* (2016.01)

(52) U.S. Cl.
CPC ............................... *H01M 8/04932* (2013.01)

(58) Field of Classification Search
CPC ............ H01M 8/04671; H01M 8/04679; H01M 8/249
See application file for complete search history.

(56) References Cited

U.S. PATENT DOCUMENTS

| | | | | |
|---|---|---|---|---|
| 3,908,153 A * | 9/1975 | Cason, Jr. | ............... | H01L 23/60 206/719 |
| 5,379,894 A * | 1/1995 | Haas | ............... | B65D 5/4208 206/461 |
| 7,520,389 B2 * | 4/2009 | Lalouette | ............... | G06F 1/184 174/50 |
| 7,597,199 B1 * | 10/2009 | Rochelo | ............... | A45C 11/00 206/703 |
| 7,673,747 B2 * | 3/2010 | Yoda | ............... | B65D 25/04 206/320 |
| 2004/0185319 A1 | 9/2004 | Enjoji et al. | | |
| 2004/0229095 A1 * | 11/2004 | Pearson | ............ | H01M 8/04679 429/431 |
| 2006/0097694 A1 * | 5/2006 | Nagura | ............... | H01M 2/1022 320/112 |
| 2008/0050645 A1 * | 2/2008 | Kai | ............ | B60L 11/1861 429/61 |
| 2011/0151311 A1 * | 6/2011 | Lee | ............... | H01M 2/1077 429/156 |
| 2011/0259789 A1 * | 10/2011 | Fan | ............... | B60R 11/0258 206/701 |
| 2012/0034514 A1 * | 2/2012 | Baek | ............... | H01M 2/1061 429/186 |
| 2012/0141851 A1 * | 6/2012 | Hou | ............... | H01M 2/1088 429/96 |
| 2013/0252042 A1 * | 9/2013 | Kobayashi | ............... | H01G 2/10 429/71 |
| 2013/0280596 A1 * | 10/2013 | Lee | ............... | H01M 2/1061 429/176 |

FOREIGN PATENT DOCUMENTS

| | | | |
|---|---|---|---|
| EP | 1923945 A1 | | 5/2008 |
| EP | 2166607 A1 | * | 3/2010 |

OTHER PUBLICATIONS

Canadian Office Action in related application CA 2,876,637 dated Jan. 16, 2016.

* cited by examiner

*Primary Examiner* — Ula C Ruddock
*Assistant Examiner* — Scott J Chmielecki
(74) *Attorney, Agent, or Firm* — Patterson + Sheridan, LLP

(57) ABSTRACT

A system and method for operating a fuel cell system to control an amount of degradation to the fuel cell system. The fuel cell system is operative to switch between two or more power sources to provide power to a load. The switching is designed to minimize degradation of a fuel cell of the fuel cell system.

19 Claims, 6 Drawing Sheets

SYSTEM AND METHOD FOR FUEL CELL DEGRADATION MANAGEMENT

BACKGROUND

The efficiency of batteries and fuel cells typically decreases because of degradation imparted on the battery or fuel cell during use. The degradation of a fuel cell or a battery can be caused by various reasons. For example, the degradation of a battery or fuel cell can be caused by a property change in the battery or fuel cell. In another example, the degradation of a battery or fuel cell can be caused by a loss of an active material. In some instances, the degradation process can accelerate at higher temperatures.

Degradation may cause an internal resistance or impedance of the battery or fuel cell to increase, thus reducing the efficiency of the battery or fuel cell. In some applications, degradation can reduce power performance. In a significant portion of discharge situations, a relatively larger current draw, at increasing periods of time, often results in relatively higher levels of degradation, increasingly becoming non-reversible as the current draw increases or the time period of discharge is extended.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, a fuel cell system is provided. The fuel cell system includes a first power source comprising a fuel cell assembly operative to provide electrical power to a load, a second power source operative to provide electrical power to the load, and a fuel cell controller communicatively coupled to the first power source and the second power source and operative to reduce a type of degradation of the fuel cell assembly by alternating power to the load between the fuel cell assembly and the second power source.

According to another embodiment disclosed herein, a method for operating a fuel cell system is provided. The method includes receiving a fuel cell impedance degradation map for a first fuel cell assembly having an internal impedance, the fuel cell impedance degradation map comprising an acceptable impedance adjusted for voltage and current, setting a first impedance value for the first fuel cell assembly, determining a degradation variable, setting an impedance degradation criterion that corresponds to an operational parameter that causes a reduction in an output voltage, corresponds to a condition that causes a reduction in an output voltage, or corresponds to a measurement of a reduction in output voltage, activating the first fuel cell assembly to provide power to a load, measuring the degradation variable associated with the first fuel cell assembly, calculating a second impedance value based on the measured degradation variable, and determining if the second impedance value is within the degradation criterion. If the second impedance value is within the degradation criterion, the method further includes maintaining the fuel cell assembly to provide power to the load. If the second impedance value is outside the degradation criterion, the method further includes activating a second fuel cell assembly to provide power to the load, and deactivating the first fuel cell assembly.

According to yet another embodiment disclosed herein, a computer-readable storage medium with computer-executable instructions is provided that, when executed by a computer, cause the computer to receive a fuel cell impedance degradation map for a first fuel cell assembly having an internal impedance, the fuel cell impedance degradation map comprising an acceptable impedance adjusted for voltage and current, set a first impedance value for the first fuel cell assembly, determine a degradation variable, set an impedance degradation criterion that corresponds to an operational parameter that causes a reduction in an output voltage, corresponds to a condition that causes a reduction in an output voltage, or corresponds to a measurement of a reduction in output voltage, activate the first fuel cell assembly to provide power to a load, measure the degradation variable associated with the first fuel cell assembly, calculate a second impedance value based on the measured degradation variable and determine if the second impedance value is within the degradation criterion. If the second impedance value is within the degradation criterion, the computer maintains the fuel cell assembly to provide power to the load. If the second impedance value is outside the degradation criterion, the computer activates a second fuel cell assembly to provide power to the load, and deactivates the first fuel cell assembly.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

Figure 1:
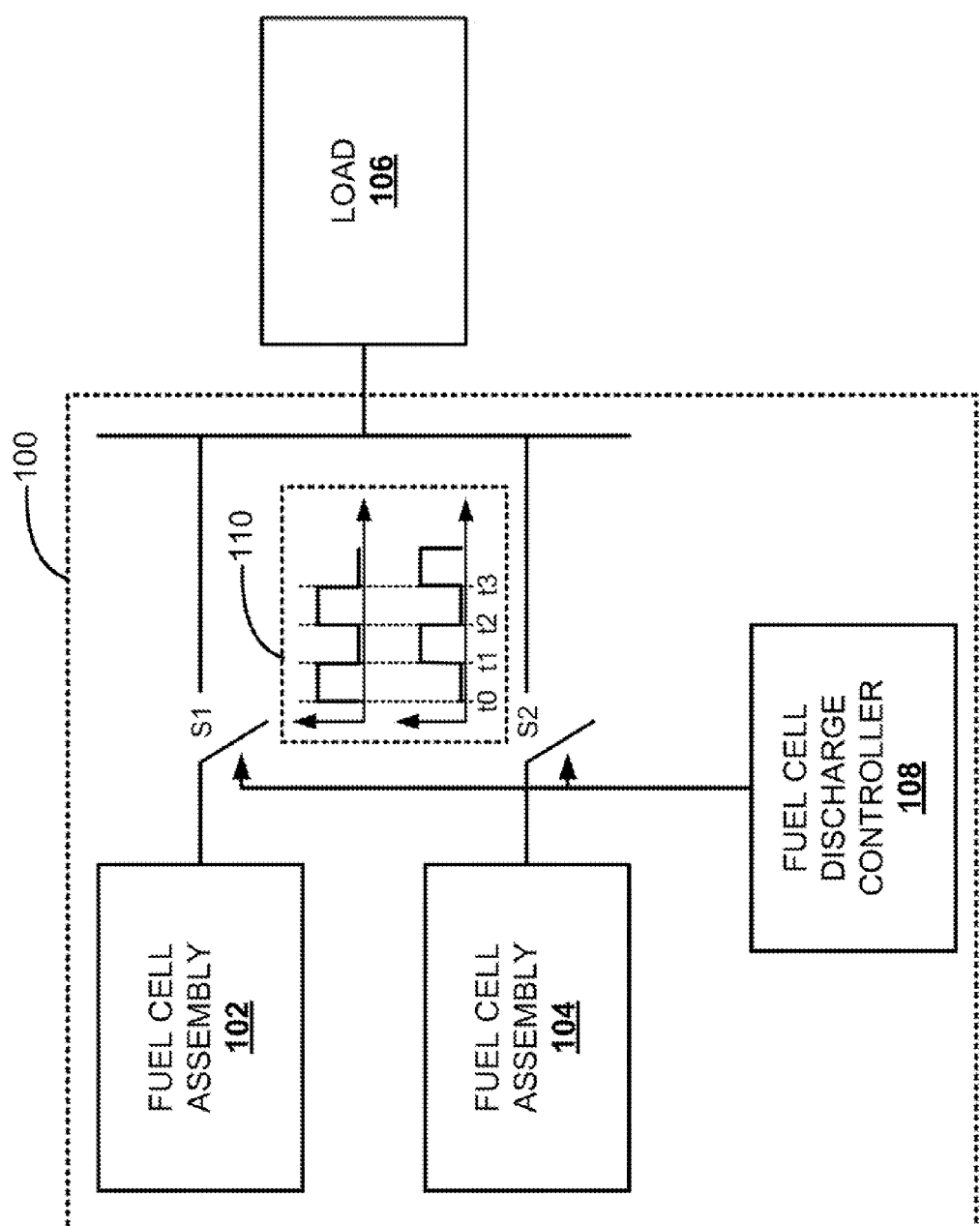
FIG. 1 is a schematic circuit diagram illustrating a fuel cell system configured to manage degradation according to at least one embodiment disclosed herein.

The plurality of figures presented in this application illustrates variations and different aspects of the embodiments of the present disclosure. Accordingly, the detailed description on each illustration will describe the differences identified in the corresponding illustration.

DETAILED DESCRIPTION

The following detailed description is directed systems and methods for fuel cell degradation management using a fuel cell discharge controller. The fuel cell discharge controller, in some configurations, alternates power to a load between two or power supplies. In some examples, alternating power supplies can reduce or minimize the degradation to the two or more power supplies. The present disclosure is susceptible of embodiment in many different forms. There is no intent to limit the principles of the present disclosure to the particular disclosed embodiments. In the following detailed description, references are made to the accompanying drawings that form a part hereof and in which are shown by way of illustration specific embodiments or examples.

Aspects of this disclosure may be used in conjunction with various types of batteries or fuel cells. One type of fuel cell is the solid oxide fuel cell. A conventional solid oxide fuel cell may be constructed using generally four layers: a porous, ceramic anode; a dense, ceramic electrolyte; a thin, porous cathode; and a metallic or ceramic interconnect. Because of the high temperatures often needed to operate these types of fuel cells, degradation may occur. Some examples of types of degradation relating to solid oxide fuel cells include, but are not limited to, interconnect oxidation, delamination between the electrode and the electrolyte, detachment of the interface between the interconnect and the electrode, and the like. Other types of power sources may suffer from the same types of degradation, or other types, depending on the construction and use of the power source.

It should be understood that the present disclosure is not limited to any particular type of power source, and may include, but is not limited to, various types of batteries and fuel cells. It should also be understood that the present disclosure is not limited to any particular type of degradation. Referring now to the drawings, in which like numerals represent like elements throughout the several figures, aspects of the present disclosure will be presented.

FIG. 1 is a schematic circuit diagram illustrating a fuel cell system 100 configured to manage degradation, according to at least one embodiment disclosed herein. The fuel cell system 100 includes a fuel cell assembly 102 and a fuel cell assembly 104 that are operative to, when so configured, supply electrical power to a load 106. The fuel cell system 100 also includes a fuel cell discharge controller 108 in communication with a switch S1, associated with the fuel cell assembly 102, and a switch S2, associated with the fuel cell assembly 104. It should be understood that while two fuel cell assemblies are illustrated in FIG. 1, more than two fuel cell assemblies may be used and is considered to be within the scope of the presently disclosed subject matter. Two fuel assemblies are illustrated merely for purposes of illustrating a configuration of the presently disclosed subject matter.

In some configurations, the fuel cell assembly 102 or the fuel cell assembly 104 may be constructed from various types or categories of fuels cells including, but not limited to, metal hydride, electro-galvanic, direct formic acid, zinc-air, microbial, upflow microbial, regenerative, direct borohydride, proton exchange membrane, phosphoric acid, high temperature, solid oxide, molten carbonate, and the like.

In some configurations, the fuel cell assembly 102 or the fuel cell assembly 104 may be constructed from one or more fuel cells connected in a series, parallel, or series/parallel configuration. Multiple fuel cells in one assembly may be used when the power needs are greater than what a single fuel cell may be able to provide. Arranging the fuel cells in various configurations can increase the output voltage, current, power, and the like.

In still further configurations, either the fuel cell assembly 102 or the fuel cell assembly 104 may be replaced by a different type of power source, such as a battery or flow cell. It should be appreciated that the present disclosure is not limited in any manner to any particular differentiation between a fuel cell and a battery, as both may be used interchangeably within the scope of the present disclosure. Further, it should be understood that some fuel cells may be considered batteries in some configurations, and vice-versa.

During operation, the fuel cell assembly 102 and the fuel cell assembly 104 are activated and placed into service vis-à-vis their respective switches. For example, the fuel cell assembly 102 is activated when the switch S1 is closed, creating an electrical connection between the fuel cell assembly 102 and the load 106. In a similar manner, the fuel cell assembly 104 is activated when the switch S2 is closed, creating an electrical connection between the fuel cell assembly 104 and the load 106. In some configurations, the switch S1 and the switch S2 may be closed at the same time, facilitating cooperative delivery of power from both the fuel cell assembly 102 and the fuel cell assembly 104.

In some examples, the delivery of the power is in equal time amounts, though it should be understood that different fuel cells may be able to provide power in different amounts. The time to switch between two power sources can be determined by the impedance value in comparison to degradation criteria. In some instances, as a fuel cell is degrading, the time between two power sources becomes shorter and shorter, because of a role of the irreversible degradation portion.

During the operation of the fuel cell assembly 102 or the fuel cell assembly 104, degradation may occur. The type and degree of degradation may depend on various factors such as the type of fuel cell, the discharge rate, and fuel cell operational temperature. The degradation may increase the internal resistance of the fuel cell, thus increasing impedance and reducing efficiency. Various types of degradation may be categorized into two general categories: non-recoverable and recoverable.

In a non-recoverable degradation situation, it may be very difficult, or impossible, to reasonable reverse the degradation. An example of non-reversible degradation in a battery may lithium-particle expansion caused by current discharge. During the discharge of a lithium-ion battery, under certain conditions, the lithium pellets may "swell" due to the ion exchange. The swelling of the pellets often fractures the pellet-substrate interface, thus reducing the battery's efficiency.

In a recoverable degradation situation, the damage to the fuel cell may be partially or fully recoverable, i.e. reversible. It should be understood that "damage" is not limited to structural deformations (such as substrate breakdown) in a fuel cell, and may include other effects caused by current output that reduce the voltage output of the fuel cell. For example, in a polymer-based fuel cell, degradation may occur in the polymer matrix due to the chemical reactions that generate the electrons for current flow. The degradation may be a change in the chemical properties of the polymer matrix that reduce its chemical reactivity, possibly reducing current output.

A significant portion of damage that may be deemed recoverable may result in non-recoverable degradation if the operational parameters that are causing the degradation are left unchecked, e.g. output current is maintained. In some circumstance, removing the fuel cell from the circuit (i.e. deactivating the fuel cell), may allow the fuel cell assembly to recover from the degradation caused by the operation of the fuel cell. Depending on the length and time that the fuel cell is deactivated, the fuel cell may recover partially or fully recoverable degradation caused by the operation of the fuel cell.

The fuel cell discharge controller 108 may be operative to activate and deactivate the fuel cell assembly 102 and the fuel cell assembly 104. If the fuel cell assembly 102 and the fuel cell assembly 104 are operating in an alternating mode, while the fuel cell assembly 102 is activated, the fuel cell assembly 104 is deactivated, illustrated by current flow chart 110. The fuel cell discharge controller 108 may cause the switch S1 to close, electrically connecting the fuel cell assembly 102 to the load 106, and providing power to the load. In a different manner, the fuel cell discharge controller 108 may cause the switch S2 to open, deactivating the fuel cell assembly 104.

Depending on the configuration of the fuel cell controller 108, the fuel cell controller 108 may activate and deactivate the fuel cell assembly 102 and the fuel cell assembly 104 in an attempt to reduce the degradation of the particular fuel cell assembly 102 or 104. The fuel cell discharge controller 108 may be operative to control switches S1 and S2 to remove the particular fuel cell from service.

Although it is shown in FIG. 1 that the fuel cell discharge controller 108 is in electrical communication with the switches S1 and S2, it should be understood that the present disclosure is not limited to, nor does it require, such a configuration. For example, the fuel cell discharge controller 108 may be operative to transmit a control signal to another device (not shown), which may be operative to receive the control signal and open or close the appropriate switch. Further, it should be understood that the present disclosure is not limited to, nor does it require, physical switches, as various configurations of the present disclosure may implement logical switches and would still be considered within the scope of the present disclosure.

The fuel cell discharge controller 108 may be configured to open or close the switches S1 and S2 based on various factors. For example, the fuel cell discharge controller 108 may be configured to open or shut the switch S1 or the switch S2 based on operational conditions such as the level of current output of the fuel cell, a decrease or increase in voltage of the fuel cell, a temperature of the fuel cell, a time in which the fuel cell has been active, and the like.

The fuel cell discharge controller 108 may be also configured to open or close the switch S1 and the switch S2 based on other factors such as the type of the fuel cell, a measured or calculated ability of the fuel cell to withstand various types of degradation, the construction of the fuel cell, the age of the fuel cell, and the like. The fuel cell discharge controller 108 may be configured to use one or more factors, including, but not limited to, the factors listed above.

Figure 2:
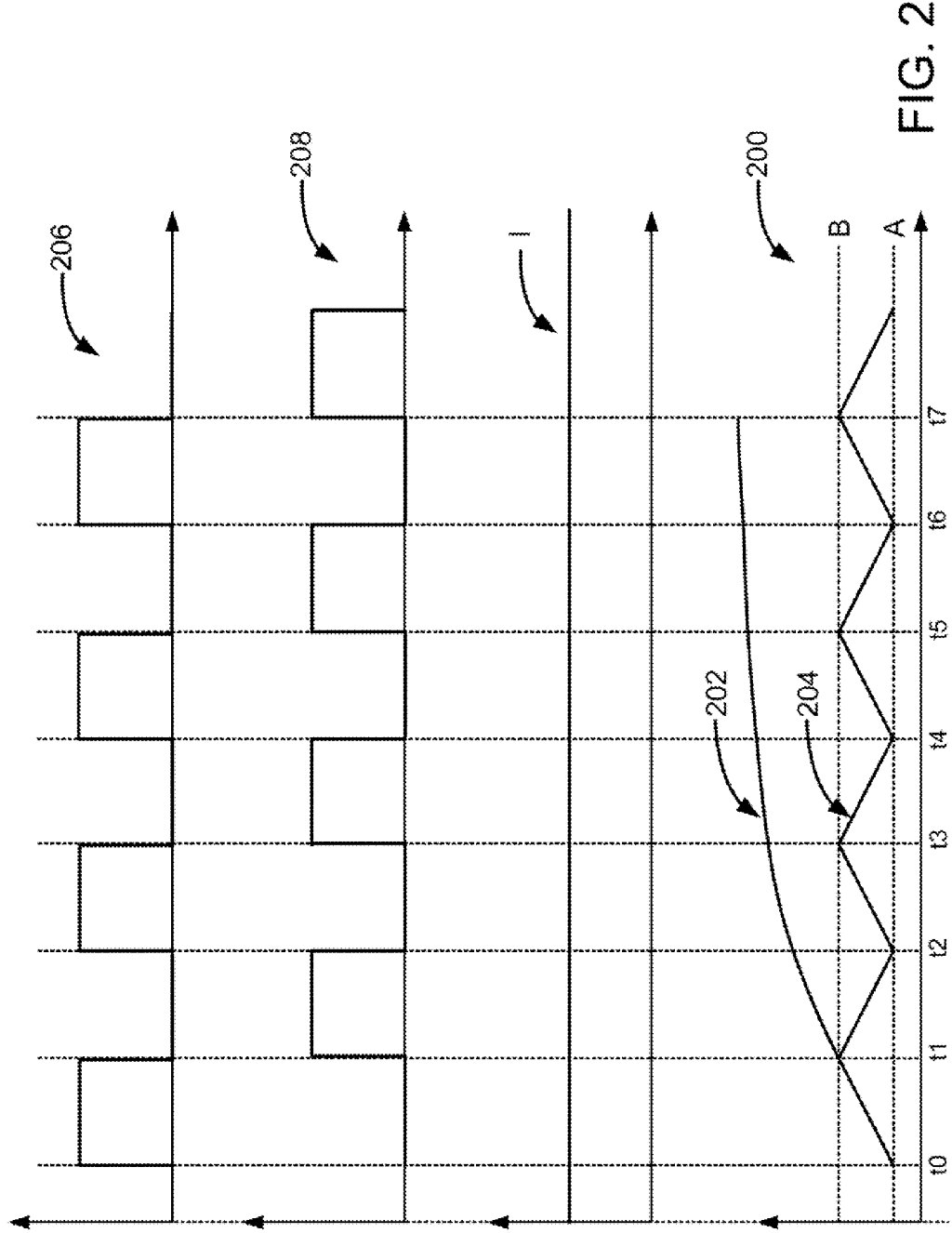
FIG. 2 is a load distribution timing diagram illustrating an example fuel cell degradation characteristic curve according to at least one embodiment disclosed herein.

FIG. 2 is a load distribution timing diagram illustrating an example fuel cell degradation characteristic curve 200 of fuel cell assembly 102 for a constant current draw of "I." The fuel cell degradation characteristic curve 200 has an uncontrolled degradation curve 202 and a managed degradation curve 204. The uncontrolled degradation curve 202 is used to illustrate the effects of degradation without degradation management. The fuel cell degradation characteristic curve 200 has as Y-axis "magnitude of degradation," and X-axis of "time."

As shown in FIG. 2, as time progresses from t0 to t1, the uncontrolled degradation curve 202 and the managed degradation curve 204 overlap. But, as time moves from time t1 to time t3, the curves diverge. The uncontrolled degradation curve 202 shows a continual increase in the amount of degradation, while the managed degradation curve 204 shows an increasing and decreasing pattern. The uncontrolled degradation curve 202 is increasing because this represents a constant on or continually activated fuel cell. As the fuel cell continues to discharge, the amount of degradation continues to increase.

The managed degradation curve 204 illustrates example degradation behavior when a fuel cell is managed by activating it and deactivating the fuel cell. In FIG. 2, the on/off behavior of fuel cell assembly 102 is illustrated as current flow chart 206 and the on/off behavior of fuel cell assembly 104 is illustrated as current flow chart 208. From time t0-t1, the fuel cell assembly 102 is activated, resulting in increased degradation, illustrated in both the uncontrolled degradation curve 202 and the managed degradation curve 204.

At time t1, the fuel cell assembly 102 is deactivated. At time t1, the uncontrolled degradation curve 202 and the managed degradation curve 204 begin to diverge. When the fuel cell assembly 102 is deactivated, the recoverable degradation begins to reverse, causing the level of degradation to decrease. The uncontrolled degradation curve 202 illustrates the degradation if the fuel cell assembly 102 was not deactivated. The fuel cell assembly 102 is managed by deactivation and activation from time t1 to time t7. As can be observed in FIG. 2, the managed degradation curve 204 shows a variable level of degradation between level A and level B. Depending on the configuration, the degradation may be termed as being managed between level A and level B.

Figure 3:
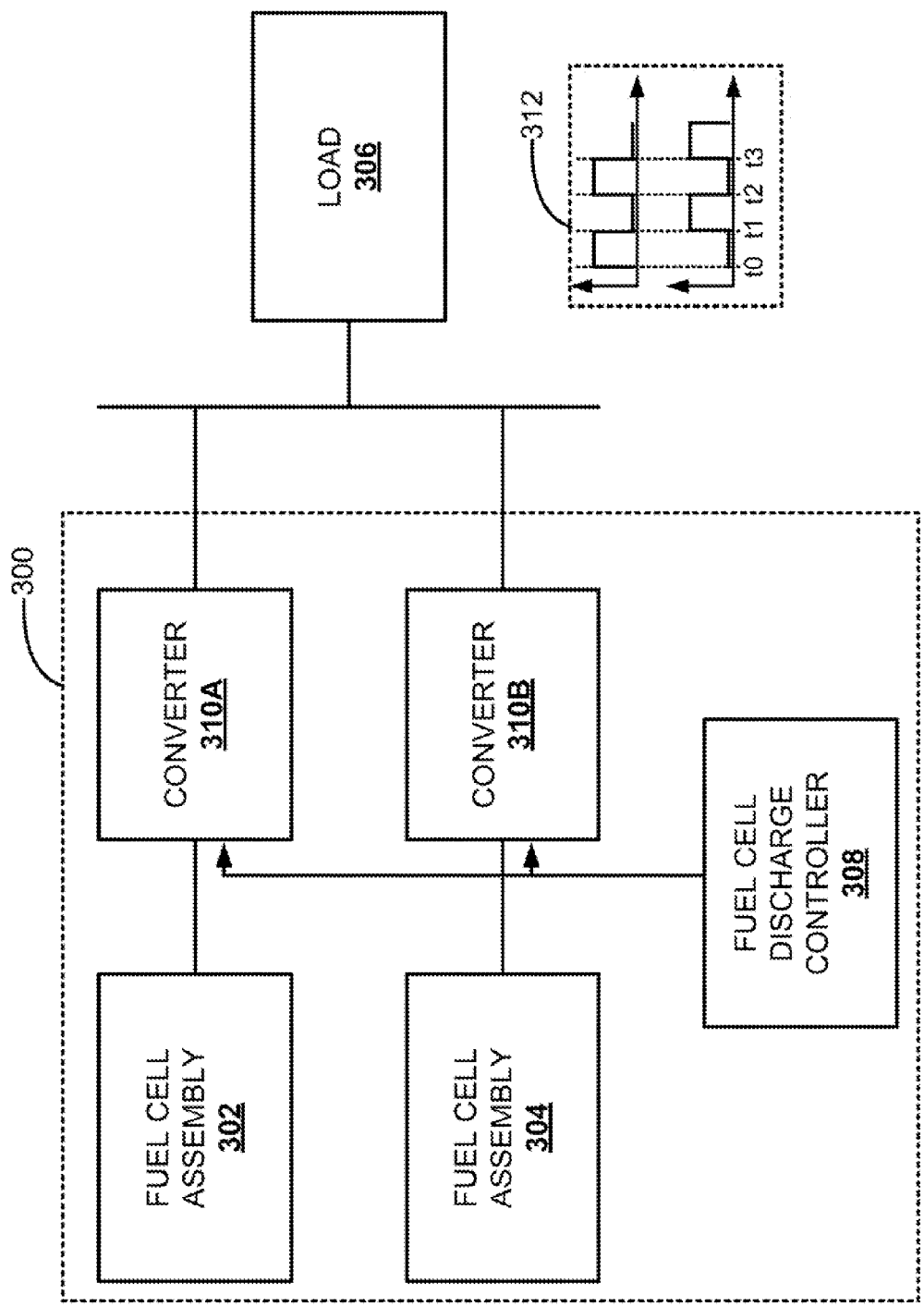
FIG. 3 is a schematic circuit diagram illustrating the use of converters to alternate between fuel cell assemblies according to at least one embodiment disclosed herein.

FIG. 3 is a schematic circuit diagram illustrating a fuel cell system 300 configured to manage degradation using one or more converters, according to at least one embodiment disclosed herein. The fuel cell system 300 includes a fuel cell assembly 302 and a fuel cell assembly 304 that are operative to provide power to a load 306. The fuel cell system 300 also includes a fuel cell discharge controller 308 in communication with a converter 310A, associated with the fuel cell assembly 302, and a converter 310B, associated with the fuel cell assembly 304.

During operating of the fuel cell system 300, the fuel cell assembly 302 and the fuel cell assembly 304 are alternatively activated and deactivated by the fuel cell discharge controller 308 using the converter 310A and the converter 310B, respectively. The converters 310A or 310B can be DC-to-DC or DC-to-AC types of power electronics converters using any existing converter topologies. The converter 310A and the converter 310B may be configured to receive an input from the fuel cell discharge controller 308 to activate or deactivate. As used herein, a converter, such as the converter 310A or 310B, may be of any configuration that is operative to convert direct current coming from the fuel cell assemblies 302 or 304 to alternating current to power the load 306. In another configuration, the converter 310A or 310B may be of any configuration that is operative to convert direct current coming from the fuel cell assemblies 302 or 304 to direct current to power the load 306

The converters 310A or 310B may be operative to be deactivated or activated by the fuel cell discharge controller 308. When deactivated, the converter 310A or 310B may not be energized to convert direct current from fuel cell assembly to load, effectively operating as an open switch. When activated, the converter 310A or 310B may be energized to convert direct current from fuel cell assembly to load, effectively operating as a closed switch. The activation and deactivation may be viewed in the context of a current flow chart 312. It should be noted that the use of a converter is merely exemplary, as any component or logical operation may be used to activate and deactivate the fuel cell assembly 302 or the fuel cell assembly 304 by acting as a switch.

Figure 4:
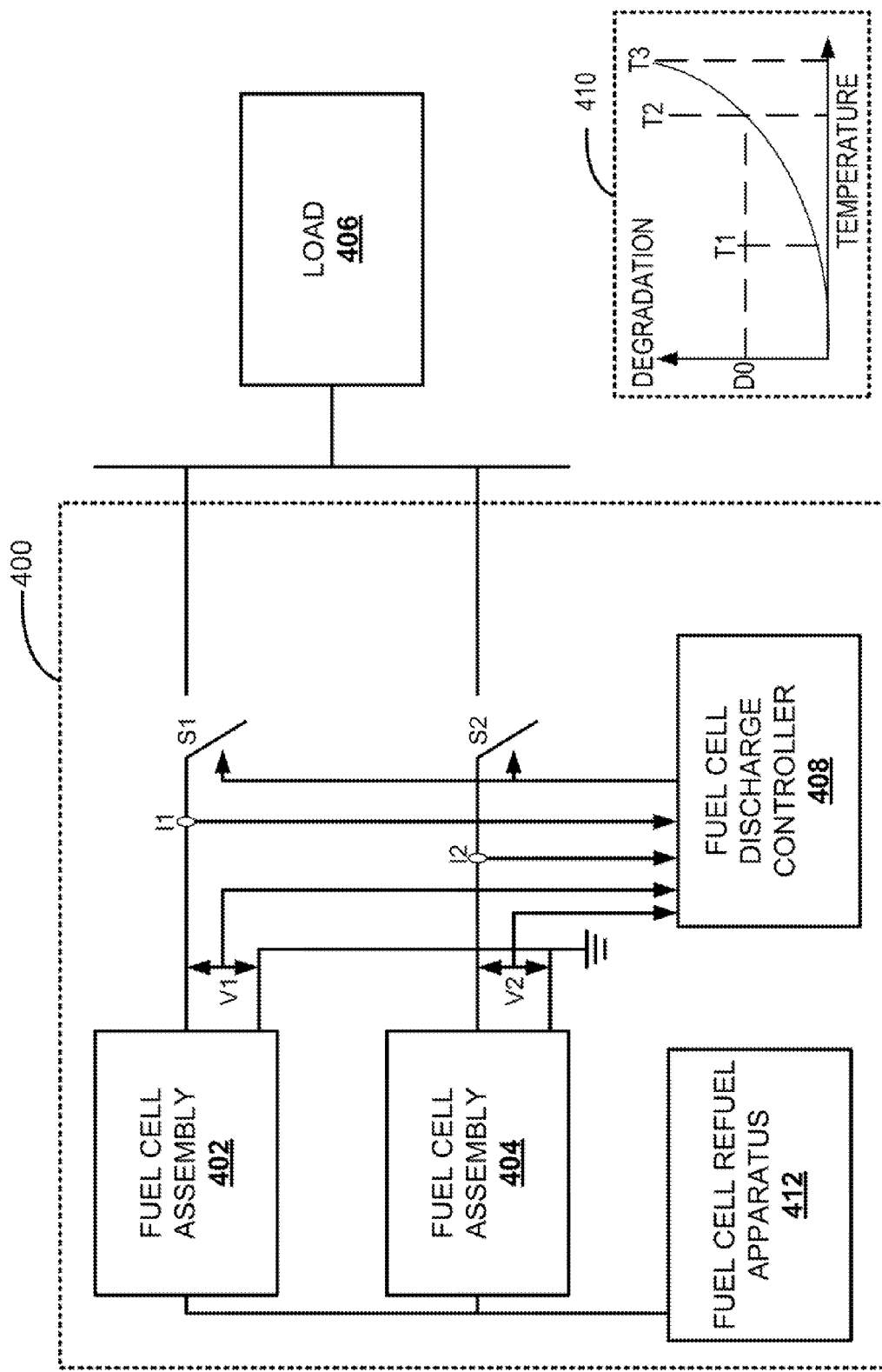
FIG. 4 is a schematic circuit diagram illustrating an example fuel cell system using a fuel cell discharge controller operative to measure at least one degradation variable according to at least one embodiment disclosed herein.

FIG. 4 is a schematic circuit diagram illustrating an example fuel cell system 400 using a fuel cell discharge controller operative to measure at least one degradation variable according to at least one embodiment disclosed herein. As used herein, a "degradation variable" may include any operational parameter that causes a reduction in the output voltage of one or more fuel assemblies, is indicative of a condition that causes the reduction, or is a measurement of the reduction itself (e.g. voltage). For example, and not by way of limitation, a degradation variable may be current output, voltage, temperature, and time. It may be beneficial to measure degradation variables to reduce fuel cell degradation.

The fuel cell system 400 includes a fuel cell assembly 402 and a fuel cell assembly 404. The fuel cell assembly 402 and the fuel cell assembly 404 are operative to provide power to the load 406. The fuel cell system 400 also includes a fuel cell discharge controller 408. The fuel cell discharge controller 408 is operative to activate or deactivate the fuel cell assembly 402 and the fuel cell assembly 404 by causing switches S1 and S2, respectively, to open or close.

As noted above, a fuel cell discharge controller 408 may receive various inputs to determine when to activate or deactivate a particular fuel cell assembly. Some examples provided above are time and temperature. Other examples provided above are voltage of the fuel cell and current output from the fuel cell. The voltage and current examples are illustrated in FIG. 4.

In FIG. 4, the fuel cell discharge controller 408 is operative to receive as inputs measured voltage V1, representing the voltage of the fuel cell assembly 402, measured voltage V2, representing the voltage of the fuel cell assembly 404, measured current I1, representing output current from the fuel cell assembly 402, and measured current I2, representing output current from the fuel cell assembly 404. The voltages, V1 and V2, and the currents, I1 and I2, may represent various operational parameters that are used by the fuel cell discharge controller 408 to determine when to activate or deactivate the fuel cell assembly 402 and the fuel cell assembly 404.

Degradation map 410 is an example of a degradation map that may be used to determine a value of a degradation variable as an input to the fuel cell system 400. It should be understood that the degradation map 410 is provided for descriptive purposes only. Degradation maps may vary depending on the configuration of a particular system from which the data is taken. In some examples, voltage and current (sometimes measured as discharge rate) and temperature can be measured for locating a corresponding impedance. In some examples, the impedance may not be mapped. The degradation map 410 has an X-axis of "Temperature" and a Y-axis of "Degradation." It should be understood that temperature is merely an example of a degradation variable. Other degradation variables may be included, either alone or in combination with other degradation variables, and are considered to be within the scope of the present disclosure.

When the fuel cell assembly 402 or the fuel cell assembly 404 are disconnected from the load 406, a fuel cell refuel apparatus 412 may be used to refuel the fuel cell assembly 402 or the fuel cell assembly 404. As used herein, "refuel" means to provide one or more components to the fuel cell assembly 402 or the fuel cell assembly 404 to allow the fuel cell assembly 402 or the fuel cell assembly 404 to provide power.

In the present example, the temperature is an internal temperature of a fuel cell in the fuel cell assembly 402 or 404 and the Degradation is an internal impedance of a fuel cell in the fuel cell assembly 402 or 404. As the Temperature increases, the internal impedance (Degradation) increases. In this context, the temperature is indicative of a condition in a fuel cell that may cause the degradation of a fuel cell. The degradation map 410 may be constructed using various methods.

In one example use of the degradation map 410, the fuel cell system 400 may be configured to prepare to switch from the active fuel cell assembly to the inactive fuel cell assembly at temperature T1, and perform the switch at temperature T2. The fuel cell system 400 may also be configured to deactivate the active fuel cell assembly at temperature T3 regardless of whether or not an inactive fuel cell assembly has been activated.

One or more of the temperatures, T1, T2, and T3, may represent various conditions that are preferable to be acted upon by the fuel cell system 400 in various configurations. For example, the temperature T2 may represent a degradation criterion D0 above which there may be a particularly high risk of resulting in permanent damage to the fuel cell. By maintaining the temperature below T2, the degradation criterion D0 may not be reached, thus increasing the probability that any damage to the fuel cell may be reversible. Thus, the degradation criterion D0 may indicate an acceptable impedance of one or more of the fuel cells, the impedance indicative of an amount of damage imparted on the fuel cell caused by the discharge of the fuel cell. The use of the degradation map 410 is explained in further detail in FIG. 5, below.

Figure 5:
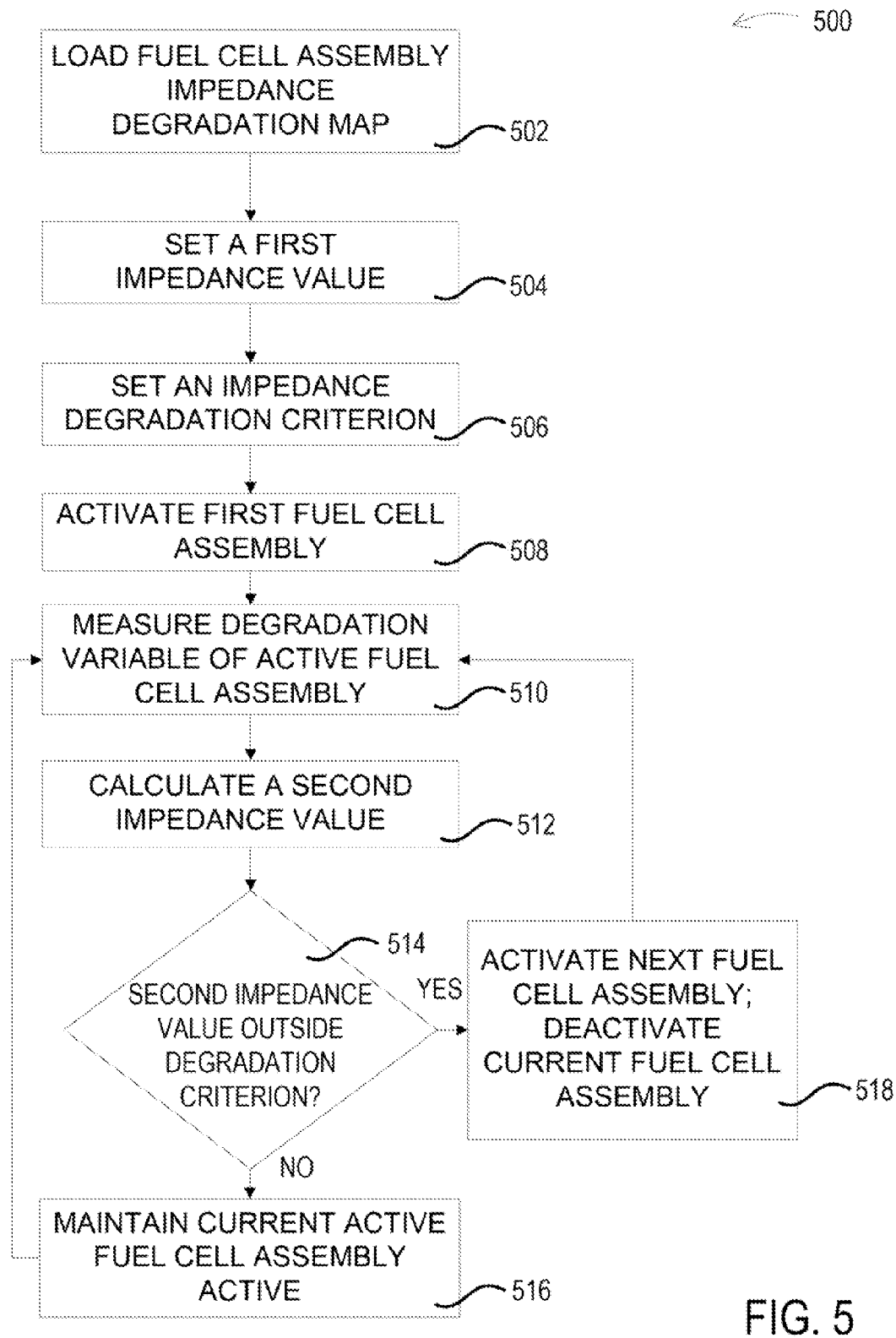
FIG. 5 illustrates one configuration of a routine for minimizing fuel cell assembly degradation according to at least one embodiment disclosed herein.

FIG. 5 illustrates one configuration of a routine 500 for minimizing fuel cell assembly degradation according to at least one embodiment disclosed herein. Unless otherwise indicated, more or fewer operations may be performed than shown in the figures and described herein. Additionally, unless otherwise indicated, these operations may also be performed in a different order than those described herein.

The routine 500 of FIG. 5 illustrates an interleaved method. In an interleaved method, a fuel cell discharge controller is configured to activate a fuel cell assembly, while maintaining other fuel cell assemblies in their deactivated state. In the deactivated state, the fuel cell assemblies are in a recovery period, configured to allow the fuel cell assemblies to recover at least a portion of the degradation caused by current discharge. Once the fuel cell discharge controller determines the in-use fuel cell assembly is ready for deactivation, the fuel cell discharge controller activates the next fuel cell assembly and deactivates the in-use fuel cell assembly.

The routine 500 commences at operation 502, where a fuel cell impedance degradation map is loaded into the fuel cell discharge controller. In some configurations, the fuel cell impedance degradation map may be a function having one or more variables. The fuel cell impedance degradation map may be used by a fuel cell discharge controller to calculate whether to activate or deactivate a fuel cell assembly.

The routine 500 continues to operation 504, wherein a first impedance value is set. The first impedance value may be a baseline value to which the fuel cell discharge controller compares calculated or measured impedance values. The comparison may be used by the fuel cell controller to determine if the currently active fuel cell controller should be deactivated.

The routine 500 continues to operation 506, where an impedance degradation criterion is set. The impedance degradation criterion may be a threshold or variance from the initial impedance value. The fuel cell discharge controller may use the impedance degradation criterion as a set point to measure a change in impedance value or as a set point to measure an absolute value of impedance.

The routine 500 continues to operation 508, where the first fuel cell assembly is activated. As described above, the fuel cell discharge controller may close a "switch," placing the fuel cell assembly in electrical communication with a load, providing power to the load.

The routine 500 continues to operation 510, where a degradation variable of the active fuel cell is measured. In some circumstances where it is undesirable or impossible to measure the impedance of a fuel cell assembly while the fuel cell assembly is active, the fuel cell discharge controller may receive various inputs as variables. The variables may be used by the fuel cell controller to calculate, using the fuel cell impedance degradation map, the impedance of an active fuel cell. Some variables may include, but are not limited to, time, current, and voltage. The variable is used at routine 512 to calculate a second impedance value.

The routine 500 continues to operation 514, where a determination is made as to whether or not the second impedance value is outside of the degradation criterion. In one example, the second impedance value may be at a value that is outside of an allowable tolerance band for impedance values. In another example, the second impedance value may be within an allowable tolerance band for absolute impedance values, but may be outside of an allowable tolerance band for a rate of change of impedance values. These and other examples are considered to be within the scope of the present disclosure.

If the second impedance value is inside the degradation criterion, the routine 500 continues to operation 516, where the current, active fuel cell assembly is maintained. The routine 500 may continue to operation 510, where the degradation variable is measured and a similar determination is thereafter performed.

If the second impedance value is outside of the degradation criterion, the routine 500 continues to operation 518, where the next fuel cell assembly is activated and the current fuel cell assembly is deactivated. When the next fuel cell assembly is activated to provide power, the same impedance monitoring process is applied to the activated fuel cell assembly. The fuel cell assembly will be deactivated if the impedance value is outside of the degradation criterion, and the first, or another, fuel cell assembly will be activated to provide power to load. It should be understood that the present disclosure is not limited to any particular manner in which the next fuel cell assembly is brought to an active state. For example, in some configurations, the current fuel cell assembly may be deactivated prior to activating the next fuel cell assembly. In another example, a third fuel cell assembly may be activated, the current fuel cell assembly deactivated, the next fuel cell assembly activated, and the third fuel cell assembly deactivated. These and other examples are considered to be within the scope of the present disclosure.

The routine 500 may continue to operation 510, where the degradation variable is measured and a similar determination is thereafter performed. In some configurations, the next fuel cell assembly may have a different degradation map, first impedance value, and the like. In those configurations, the routine 500 may continue to operation 502 from operation 518 and continue as described above for the prior fuel cell assembly.

Figure 6:
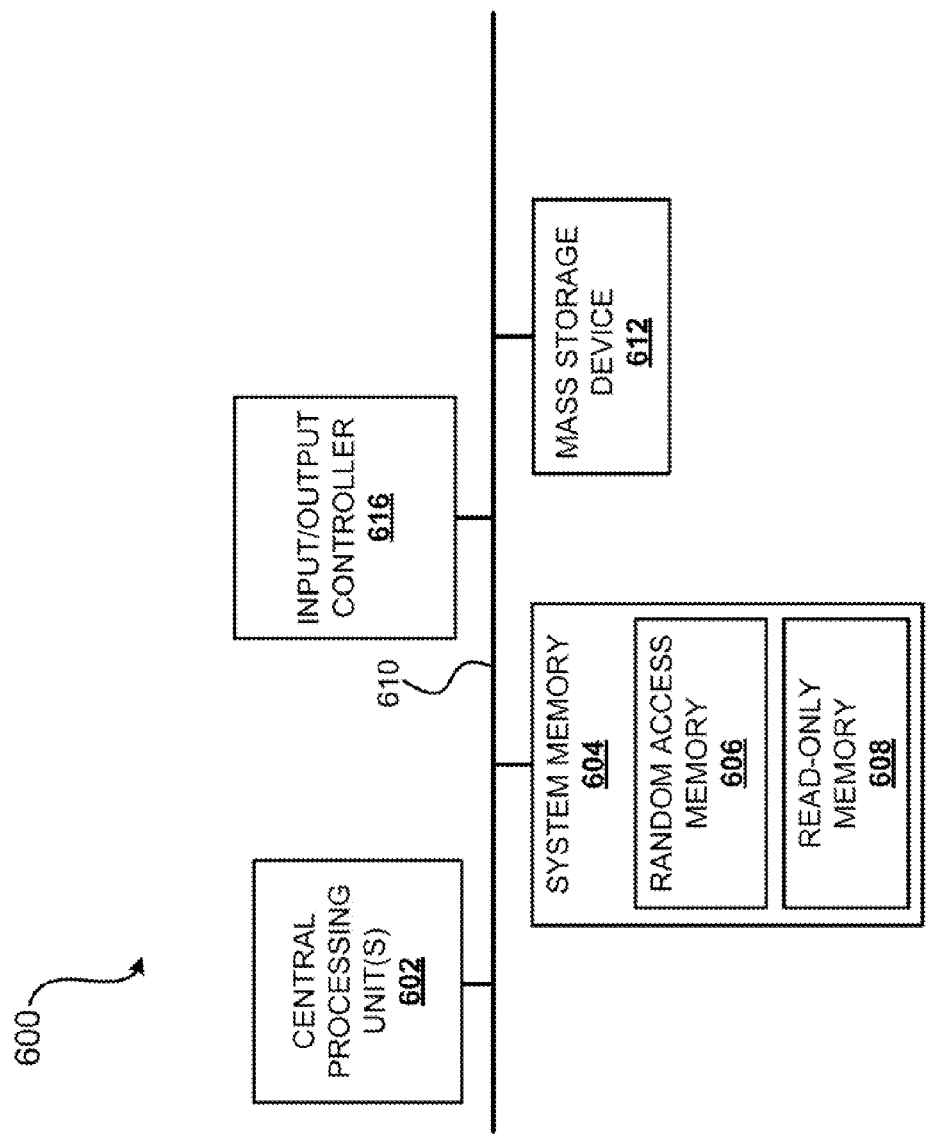
FIG. 6 is an illustrative computer in which a fuel cell discharge controller may be operated according to at least one embodiment disclosed herein.

FIG. 6 is an illustrative computer 600 in which a fuel cell discharge controller may be operated according to at least one embodiment disclosed herein. The computer 600 illustrated in FIG. 6 includes one or more central processing unit(s) ("CPUs") 602, a system memory 604, including a random-access memory ("RAM") 606 and a read-only memory ("ROM") 608, and a system bus 610 that couples the memory 604 to the CPU 602. A basic input/output system containing the routines that help to transfer information between elements within the computer 600, such as during startup, may be stored in the ROM 608.

The CPUs 602 may be standard programmable processors that perform arithmetic and logical operations for the operation of the computer 600, such as the routine 500 described above. The CPUs 602 may perform the operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer 600 may also include a mass storage device 612. The mass storage device may be an optical disk, a magnetic storage device, or a solid state storage device. The mass storage device 612 may be operative to store one or more instructions to control a fuel cell discharge controller. In another configuration, the random-access memory 606, read-only memory 608, and the mass storage device 612 may be operative to have stored thereon, either alone or in various combinations, instructions for controlling a fuel cell discharge controller.

The computer 600 may store programs and data on the mass storage device 612 by transforming the physical state of the mass storage device 612 to reflect the information being stored. The specific transformation of physical state may depend on various factors, in different implementations of this disclosure. Examples of such factors may include, but are not limited to, the technology used to implement the mass storage device 612, whether the mass storage device 612 is characterized as primary or secondary storage, and the like.

For example, the computer 600 may store information to the mass storage device 612 by issuing instructions through a storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer 600 may further read information from the mass storage device 612 by detecting the physical states or characteristics of one or more particular locations within the mass storage device 612.

The random-access memory 606, the read-only memory 608, or the mass storage device 612 may be operative as computer-readable storage mediums. Various aspects of the present disclosure may be stored on other types of computer-readable storage mediums, such as, but not limit to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. It should be understood that when the claims are interpreted in light of this present disclosure, a computer-readable storage medium does not include energy in the form of waves or signals.

The computer 600 also may include an input/output controller 616 for receiving and processing input from a number of other devices, including a keyboard, mouse, or electronic stylus. Similarly, the input/output controller 616 may provide an output to a display screen, a printer, or other type of output device.

One or more embodiments may include a computer-readable storage medium manufactured so that, when read by a properly configured computing device, instructions may be provided to control a fuel cell discharge assembly to manage fuel cell degradation.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A fuel cell system, comprising:
   a first power source comprising a fuel cell assembly electrically connected to a load;
   a second power source electrically connected to the load; and
   a fuel cell discharge controller communicatively coupled to the first power source and the second power source and programmed to receive a degradation input from either the first power source or the second power source and transmit a control signal based on the degradation input, wherein the control signal alternates operation between the first power source and the second power source to switch the power provided to the load between one of the first power source and the second power source based on the degradation input to reduce a degradation of the first power source.

2. The fuel cell system of claim 1, wherein the second power source comprises a second fuel cell assembly.

3. The fuel cell system of claim 1, wherein the fuel cell assembly comprises a fuel cell.

4. The fuel cell system of claim 1, wherein the fuel cell assembly comprises a plurality of fuel cells.

5. The fuel cell system of claim 4, wherein the fuel cell discharge controller is further programmed to alternate power to the load from the fuel cell assembly by alternating a power discharge between one or more of the plurality of fuel cells.

6. The fuel cell system of claim 1, wherein the degradation input received is a temperature of the fuel cell assembly, a discharge rate of the fuel cell assembly, a time of discharge of the fuel cell assembly, or any combination thereof.

7. The fuel cell system of claim 1, wherein the power delivered to the load is in equal time amounts from each of the first power source and the second power source.

8. The fuel cell system of claim 1, wherein the fuel cell discharge controller is further programmed to control a first converter at an output of the fuel cell assembly and a second converter at an output of the second power source, wherein the fuel cell discharge controller is programmed to alternatively activate and deactivate the first converter and the second converter.

9. The fuel cell system of claim 1, further comprising a refueling apparatus operatively connected to the fuel cell assembly or the second power source and programmed to refuel the fuel cell assembly or the second power source when disconnected from the load.

10. A fuel cell system, comprising:
    a first power source comprising a first fuel cell assembly electrically connected to a load, wherein the first fuel cell assembly comprises a plurality of fuel cells;
    a second power source comprising a second fuel cell assembly electrically connected to the load; and
    a fuel cell discharge controller communicatively coupled to the first power source and the second power source and programmed to receive a degradation input from either the first power source or the second power source and transmit a control signal based on the degradation input, wherein the control signal alternates operation between the first power source and the second power source to switch the power provided to the load between one of the first power source and the second power source based on the degradation input to reduce a degradation of the first power source.

11. The fuel cell system of claim 10, wherein the fuel cell discharge controller is further programmed to alternate power to the load from the first fuel cell assembly by alternating a power discharge from one or more of the plurality of fuel cells.

12. The fuel cell system of claim 10, wherein the degradation input received is one of a temperature of the first fuel cell assembly, a discharge rate of the first fuel cell assembly, or a time of discharge of the first fuel cell assembly.

13. The fuel cell system of claim 10, wherein the power delivered to the load is in equal time amounts from each of the first power source and the second power source.

14. The fuel cell system of claim 10, wherein the fuel cell discharge controller is further programmed to control a first converter at an output of the first fuel cell assembly and a second converter at an output of the second power source, wherein the fuel cell discharge controller is programmed to alternatively activate and deactivate the first converter and the second converter.

15. The fuel cell system of claim 1, further comprising a refueling apparatus operatively connected to the first fuel cell assembly or the second power source and programmed to refuel the first fuel cell assembly or the second power source when disconnected from the load.

16. A fuel cell system, comprising:
    a first power source comprising a fuel cell assembly electrically connected to a load;
    a second power source electrically connected to the load;
    a fuel cell discharge controller communicatively coupled to the first power source and the second power source and programmed to receive a degradation input from either the first power source or the second power source and transmit a control signal based on the degradation input, wherein the control signal alternates operation between the first power source and the second power source to switch the power provided to the load between one of the first power source and the second power source based on the degradation input to reduce a degradation of the first power source; and a refueling apparatus operatively connected to the fuel cell assembly or the second power source and programmed to refuel the fuel cell assembly or the second power source when disconnected from the load.

17. The fuel cell system of claim 16, wherein the degradation input received is one of a temperature of the fuel cell assembly, a discharge rate of the fuel cell assembly, or a time of discharge of the fuel cell assembly.

18. The fuel cell system of claim 16, wherein the power delivered to the load is in equal time amounts from each of the fuel cell assembly and the second power source.

19. The fuel cell system of claim 16, wherein the fuel cell discharge controller is further programmed to control a first converter at an output of the fuel cell assembly and a second converter at an output of the second power source, wherein the fuel cell discharge controller is programmed to alternatively activate and deactivate the first converter and the second converter.

* * * * *